US010836317B2

(12) United States Patent
Wang et al.

(10) Patent No.: US 10,836,317 B2
(45) Date of Patent: Nov. 17, 2020

(54) ON-VEHICLE IMAGE PICKUP DEVICE AND VEHICLE OUTSIDE REARVIEW MIRROR UNIT

(71) Applicant: Panasonic Intellectual Property Management Co., Ltd., Osaka (JP)

(72) Inventors: Jinsheng Wang, Kanagawa (JP); Toshihisa Suzuki, Kanagawa (JP); Masakazu Takahashi, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 61 days.

(21) Appl. No.: 16/323,279

(22) PCT Filed: May 15, 2017

(86) PCT No.: PCT/JP2017/018130
§ 371 (c)(1),
(2) Date: Feb. 5, 2019

(87) PCT Pub. No.: WO2018/109961
PCT Pub. Date: Jun. 21, 2018

(65) Prior Publication Data
US 2020/0039439 A1  Feb. 6, 2020

(30) Foreign Application Priority Data
Dec. 14, 2016 (JP) ................. 2016-242166

(51) Int. Cl.
*B60R 1/06* (2006.01)
*B60R 11/04* (2006.01)
*G02B 7/02* (2006.01)

(52) U.S. Cl.
CPC ............... *B60R 1/06* (2013.01); *B60R 11/04* (2013.01); *G02B 7/02* (2013.01)

(58) Field of Classification Search
CPC ........... B60R 1/00; B60R 1/002; B60R 1/006; B60R 1/02; B60R 1/06; B60R 1/08; B60R 1/088
See application file for complete search history.

(56) References Cited

U.S. PATENT DOCUMENTS 8,041,209 B2* 10/2011 Watanabe ............... B60R 1/12
396/429
2010/0196000 A1  8/2010 Watanabe

FOREIGN PATENT DOCUMENTS

JP  10-239747  9/1998
JP  2001-197337  7/2001
(Continued)

OTHER PUBLICATIONS

International Search Report of PCT application No. PCT/JP2017/018130 dated Aug. 8, 2017.

*Primary Examiner* — Robert E. Tallman
(74) *Attorney, Agent, or Firm* — Greenblum & Bernstein, P.L.C.

(57) ABSTRACT

An on-vehicle image pickup device is mountable to a housing provided with a through-hole. This on-vehicle image pickup device includes a main member securable to an interior of the housing, a lens disposed at one end of the main member, and a seal member formed of an elastic body and including a rib. The rib surrounds the lens in plan view as viewed along an optical axis direction of the lens, and an end portion of the rib that faces in an opposite direction to the optical axis direction has a shape that matches a curved surface shape of a circumferential edge of the through-hole of the housing.

2 Claims, 3 Drawing Sheets

(56) References Cited

FOREIGN PATENT DOCUMENTS

| JP | 2005-067338 | 3/2005 |
| JP | 2006-044514 | 2/2006 |
| JP | 2007-261503 | 10/2007 |
| JP | 2010-078978 | 4/2010 |
| JP | 4831797 B | 12/2011 |

* cited by examiner

ON-VEHICLE IMAGE PICKUP DEVICE AND VEHICLE OUTSIDE REARVIEW MIRROR UNIT

CROSS-REFERENCE TO RELATED APPLICATIONS

This application is a U.S. national stage application of the PCT International Application No. PCT/JP2017/018130 filed on May 15, 2017, which claims the benefit of foreign priority of Japanese patent application No. 2016-242166 filed on Dec. 14, 2016, the contents all of which are incorporated herein by reference.

TECHNICAL FIELD

The present disclosure relates to an on-vehicle image pickup device (hereinafter referred to as an image pickup device) and a vehicle outside rearview mirror unit.

BACKGROUND ART

A conventional on-vehicle image pickup device is mounted in the interior of a housing (for example, a housing of a door mirror) and is capable of taking an image of the outside of the housing through a through-hole formed in the housing. In order to prevent wind from entering the interior of the housing through the through-hole, a seal member (typically an O-ring) is interposed between the image pickup device and the housing (for example, see PTL 1).

CITATION LIST

Patent Literature

PTL 1: Japanese Patent Unexamined Publication No. 2006-44514

SUMMARY

For the above-described use, in PTL 1, the deformed amount of the seal member may vary from one position to another in the seal member, depending on the three-dimensional shape of the inner surface of the housing. As a consequence, wind enters the interior of the housing while the vehicle is traveling, thereby producing wind noise.

The present disclosure provides an image pickup device that makes it possible to reduce the wind noise.

An on-vehicle image pickup device according to the present disclosure is mountable to a housing provided with a through-hole. This on-vehicle image pickup device includes a main member securable to an interior of the housing, a lens disposed at one end of the main member, and a seal member formed of an elastic body and including a rib. The rib surrounds the lens in plan view as viewed along an optical axis direction of the lens, and an end portion of the rib that faces in an opposite direction to the optical axis direction has a shape that matches a curved surface shape of a circumferential edge of the through-hole of the housing.

An on-vehicle image pickup device according to the present disclosure includes the above-mentioned on-vehicle image pickup device, and a housing in which the main member of the on-vehicle image pickup device is secured. This housing is provided with a through-hole.

The present disclosure makes it possible to provide an image pickup device that can reduce wind noise, and a vehicle outside rearview mirror unit employing the image pickup device.

DESCRIPTION OF EMBODIMENTS

Figure 1:
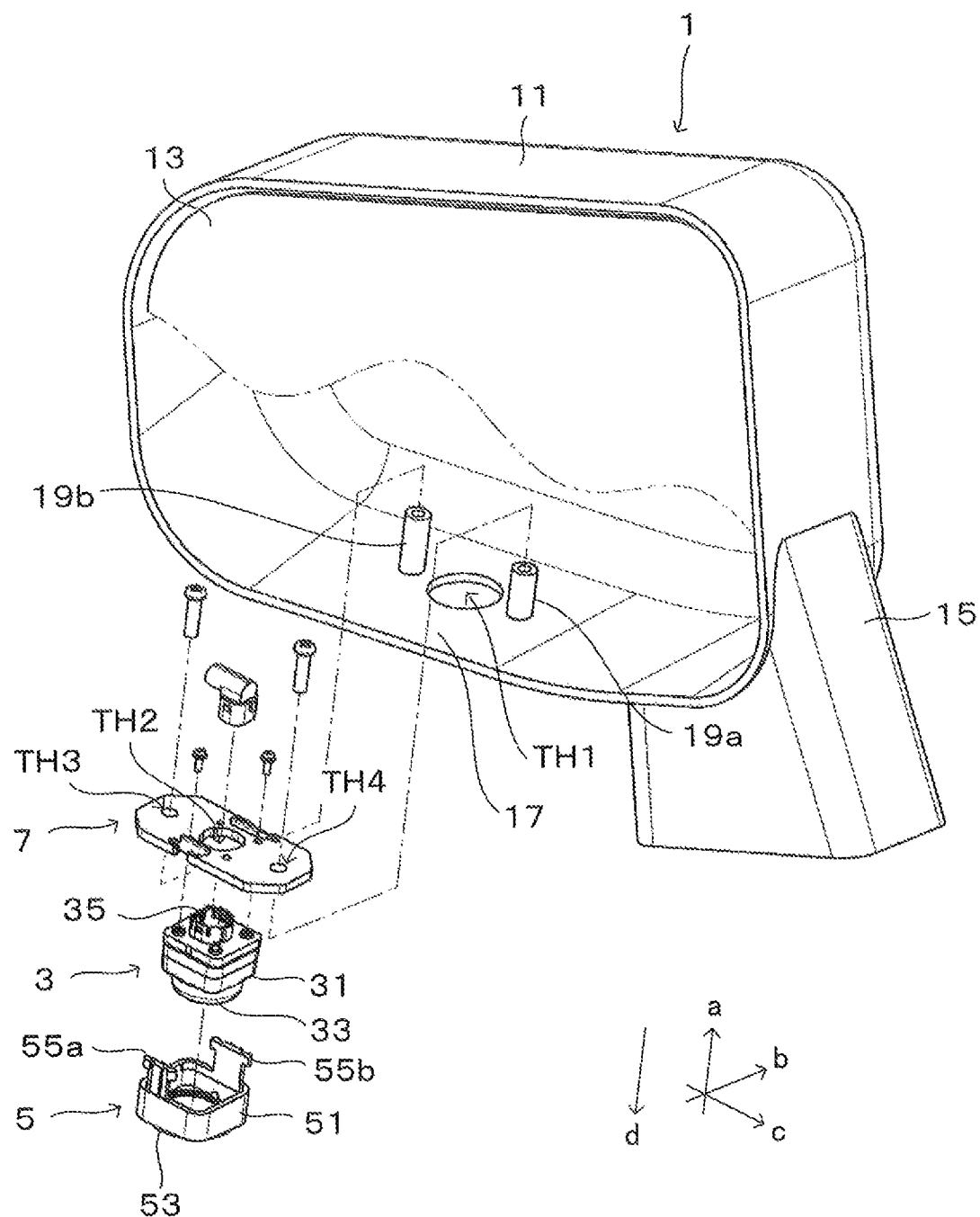
FIG. 1 is an exploded view of a vehicle outside rearview mirror unit including an image pickup unit according to an exemplary embodiment of the present disclosure.

Hereinafter, an image pickup unit according to an exemplary embodiment of the present disclosure will be described in detail with reference to the drawings.

1. Definitions

First, various terms are defined to facilitate the following description.

In the drawings, the a-axis indicates the direction extending from the center of curvature of a surface of lens 33 toward the center of curvature of the opposite surface. The surface of lens 33 faces the outside of housing 11. In the present exemplary embodiment, the a-axis direction is referred to as optical axis direction a, and the direction opposite to optical axis direction a is simply referred to as opposite direction d.

In the drawings, the b-axis and the c-axis respectively indicate the axes orthogonal to optical axis direction a. Also, the b-axis and the c-axis are orthogonal to each other. In the present exemplary embodiment, the b-axis indicates the longitudinal axis of image pickup device 3, seal member 5, and bracket 7, while the c-axis indicates the lateral axis of these components. According to the above-described viewpoint, the axis indicated by the b-axis is referred to as longitudinal axis b, and the axis indicated by the c-axis is referred to as lateral axis c.

2. Configuration of Image Pickup Device and Peripheral Configuration

Referring to FIG. 1, image pickup device 3 is mounted to a vehicle. In the example of FIG. 1, image pickup device 3 is mounted inside vehicle outside rearview mirror unit (specifically, a door mirror or a fender mirror) 1. Note that image pickup device 3 may be provided to other parts of the vehicle, such as the interior of a bumper.

First, vehicle outside rearview mirror unit 1 will be described.

Vehicle outside rearview mirror unit 1 generally includes housing 11 and rearview mirror 13.

Housing 11 is fixed to a fender or the like (not shown) of the vehicle via support member 15. Housing 11 is generally provided with an opening that opens toward the backward of the vehicle. Rearview mirror 13 is fitted into the opening. Note that FIG. 1 depicts only a portion of rearview mirror 13 so that FIG. 1 can show the interior of housing 11.

Housing 11 is basically a closed-bottom box-shaped product. The sides of housing 11 are closed except the side toward the backward of the vehicle. However, in order to allow the closed portions as well to capture the image of the road surface, for example, lower wall 17 of housing 11 is provided with a hole TH1 (hereinafter referred to as a first through-hole) penetrating lower wall 17 from the inner surface to the outer surface. The contour of through-hole TH1 is determined in accordance with the contour of main member 31 of image pickup device 3. As will be described later, the fore-end portion of main member 31 has a circular shape in plan view as viewed along optical axis direction a. In this case, through-hole TH1 may have a circular shape that is slightly larger than the plan view shape of the fore-end portion. Note that when image pickup device 3 needs to take an image in front of the vehicle, a through-hole corresponding to through-hole TH1 may be formed in the front wall of housing 11.

In addition, two bosses 19a and 19b, for example, protrude from the inner surface of lower wall 17 in optical axis direction a. Bosses 19a and 19b are opposed to each other across through-hole TH1 approximately along lateral axis c. Each of bosses 19a and 19b is formed with a screw hole having the rotation axis that is substantially parallel to optical axis direction a.

In the present exemplary embodiment, the inner surface of lower wall 17 is not formed of a single flat surface, but is formed of a complicated shape (typically a curved surface). How the inner surface is constructed is determined by, for example, the manufacturer of the vehicle. The supplier of image pickup device 3 designs image pickup device 3 in accordance with the specification determined by, for example, the manufacturer of the vehicle.

Next, the configuration of image pickup device 3 will be described.

Image pickup device 3 includes main member 31 that is made of, for example, resin and has a tubular shape.

In the present exemplary embodiment, the upstream end portion (hereinafter referred to as a "fore-end portion") of main member 31 along optical axis direction a generally has a tubular (or circular cylindrical) shape, and the downstream end portion (hereinafter referred to as a "base-end portion") generally has a rectangular parallelepiped shape. The fore-end portion has a contour such that the contour of through-hole TH1 is slightly reduced in plan view as viewed along optical axis direction a. In contrast, the base-end portion has a contour such as to enclose the fore-end portion in plan view as viewed along the same direction a.

In addition, lens 33 is supported at the fore-end edge face (i.e., the upstream-end edge face) of main member 31. Although not shown in the drawings, it is also possible that another lens may be supported in the interior of main member 31 in such a state that its optical axis is aligned with that of lens 33.

In addition, the interior of main member 31 may be provided with a substrate on which an imaging element, which may be a complementary metal semiconductor (CMOS) image sensor, is mounted. This imaging element is disposed so that the optical axis thereof is aligned with the optical axis of lens 33 or the like, and the light entering lens 33 is imaged at the light receptive surface.

Meanwhile, the base-end edge face of main member 31 is provided with connector 35 to transmit a video signal generated by the imaging element to an external device. A cable containing a power line and a data transfer line, for example, is inserted into connector 35.

In the present exemplary embodiment, image pickup device 3 additionally includes seal member 5 that is attached mainly by, for example, a worker of a supplier.

Figure 2:
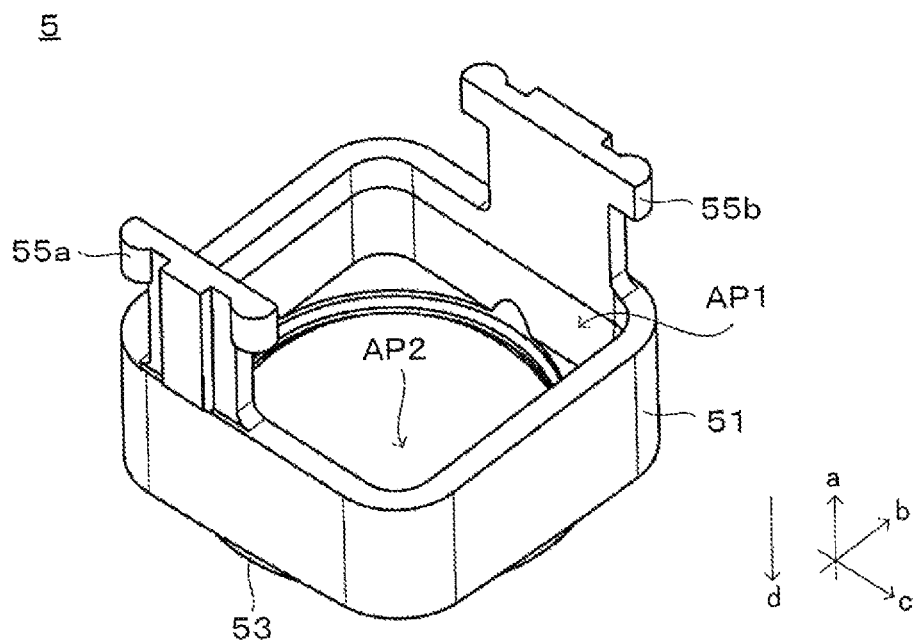
FIG. 2 is a perspective view of a seal member of the image pickup device shown in FIG. 1.

Seal member 5 is preferably made of rubber (typically ethylene propylene rubber) having a hardness in a range from 30 to 70. Seal member 5 is provided in order to appropriately reduce wind noise when image pickup device 3 is mounted in housing 11 so as to face the outside through through-hole TH1. For that purpose, as illustrated in FIGS. 1 and 2, seal member 5 includes main body 51, first rib 53, and at least two latch parts 55a and 55b. Main body 51, first rib 53, and at least two latch parts 55a and 55b are integrally formed with each other.

Main body 51 is placed over main member 31 of image pickup device 3. Main body 51 has a tubular shape that has two apertures. One of the apertures is provided in an edge face thereof (base-end edge face) in optical axis direction a, and another of the apertures is provided in another edge face thereof (fore-end edge face) in opposite direction d. More specifically, first aperture AP1 (see FIG. 2) in the base-end edge face of main body 51 has substantially the same shape as the contour of the base-end edge face of main member 31, in plan view as viewed along opposite direction d. Meanwhile, second aperture AP2 in the fore-end edge face of main body 51 has substantially the same shape as the contour of the fore-end edge face of main member 31, in plan view as viewed along optical axis direction a.

Figure 3:
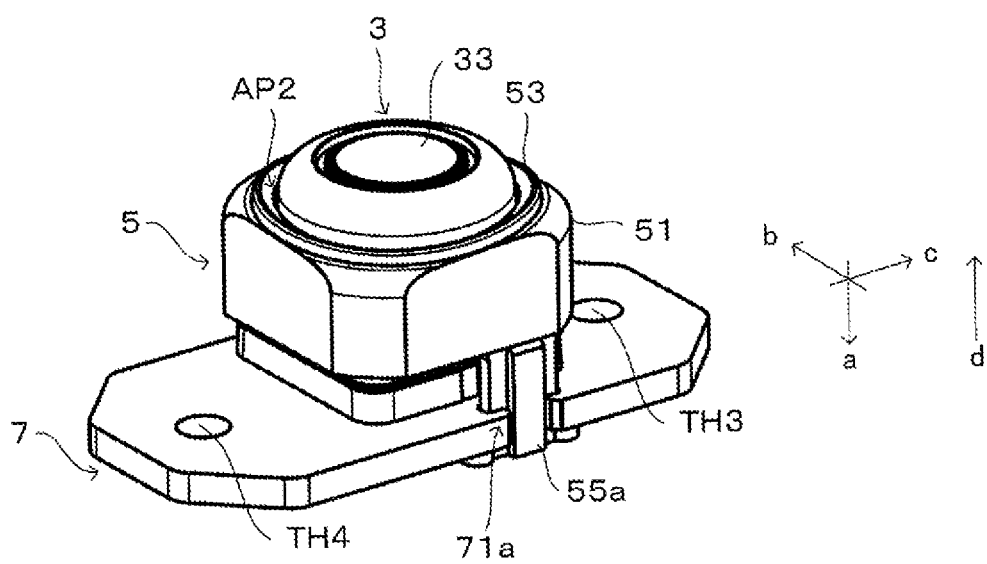
FIG. 3 is a perspective view of the image pickup device shown in FIG. 1 that is mounted on a bracket.

As illustrated in FIG. 3, first rib 53 surrounds aperture AP2 and has an annular shape in plan view as viewed along optical axis direction a. In addition, first rib 53 protrudes from the fore-end edge face of main body 51 along opposite direction d. The three-dimensional shape of such a fore-end portion (generally a ridge line) of first rib 53 is designed to match and fit the curved surface shape of the circumferential edge of through-hole TH1 of housing 11.

As illustrated in FIGS. 1 and 2, each of latch parts 55a and 55b extends in optical axis direction a from the base-end edge face of main body 51. Specifically, each of latch parts 55a and 55b protrude from opposite portions of the base-end edge face across first aperture AP1. The opposite portions are opposed to each other approximately along longitudinal axis b.

The fore-end portion of latch part 55a protrudes laterally along lateral axis c with respect to the other portion thereof, and the protruding portion is fitted and latched into later-described engaging part 71a. Likewise, the fore-end portion of latch part 55b protrudes laterally along lateral axis c with respect to the other portion thereof, and is fitted and latched into later-described engaging part 71b.

In the present exemplary embodiment, the three-dimensional shape of first rib 53 fits the curved surface shape of the circumferential edge of through-hole TH1, and therefore, it does not means that seal member 5 may be put over image pickup device 3 in any orientation. In order to restrict the orientation of seal member 5 to be placed, it is preferable that the shapes of latch parts 55a and 55b be different from each other, as exemplified in FIG. 2.

Figure 4:
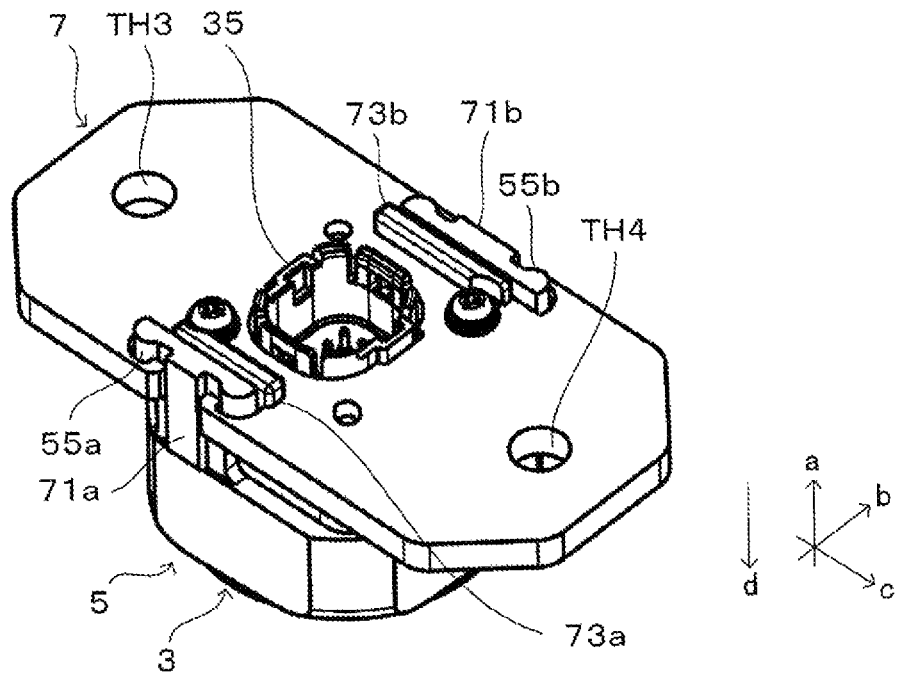
FIG. 4 is a perspective view illustrating a back side of FIG. 3.

In the present exemplary embodiment, image pickup device 3 additionally includes bracket 7. Bracket 7 is made of, for example, resin having electrical insulation property. As illustrated in FIGS. 1, 3, and 4, bracket 7 is plate-shaped. In the present exemplary embodiment, image pickup device 3 is secured (or fixed) to approximately the central portion of bracket 7 with machine screws or the like.

Additionally, second through-hole TH2, through which connector 35 of image pickup device 3 is inserted, is formed approximately at the central portion of bracket 7.

Moreover, in bracket 7, third through-hole TH3 and fourth through-hole TH4 are formed corresponding to the respective screw holes in bosses 19a and 19b. Third through-hole TH3 and fourth through-hole TH4 are opposed to each other across second through-hole TH2 approximately along lateral axis c.

Bracket 7 is further provided with engaging parts 71a and 71b.

The protruding portions provided at the fore-end portions of latch parts 55a and 55b are engaged respectively into engaging parts 71a and 71b, whereby latch parts 55a and 55b are latched into engaging parts 71a and 71b.

Specifically, engaging parts 71a and 71b are opposed to each other at least across through-hole TH2 approximately along longitudinal axis b, and also spaced apart from each other by substantially the same spatial distance as the spatial distance (span) of aperture AP1 (see FIG. 2) along longitudinal axis b. More specifically, slits are formed in the edges of bracket 7 that are opposed to each other along longitudinal axis b. Each of the slits has substantially the same width as that of the portion of respective one of latch parts 55a and 55b other than the respective fore-end portion. The opposite end portions along lateral axis c of each of the slits are provided with recesses that engage with the protruding portions provided at the fore-end portions of latch parts 55a and 55b. Engaging parts 71a and 71b have the shape as thus described.

Noted that, because the shapes of latch parts 55a and 55b are preferably different from each other, the shapes of engaging parts 71a and 71b are also different from each other correspondingly.

3. Assembling of Image Pickup Device 3 and Advantageous Effects

A worker mounts image pickup device 3 onto bracket 7. Specifically, after connector 35 is inserted through second through-hole TH2, image pickup device 3 is secured to bracket 7 with machine screws.

Next, after the worker puts seal member 5 over image pickup device 3, the worker inserts latch parts 55a and 55b through the slits of engaging parts 71a and 71b. Thereafter, the fore-end portions of latch parts 55a and 55b are respectively fitted into the recesses of engaging parts 71a and 71b, whereby latch parts 55a and 55b are latched into engaging parts 71a and 71b, respectively. As a result, seal member 5 does not easily come off from bracket 7 during the production and assembling process.

Moreover, because the shapes of hook parts 55a and 55b are different from each other and the shapes of engaging parts 71a and 71b respectively match the shapes of hook parts 55a and 55b, the worker is unlikely to mix up the orientation of seal member 5 with respect to main body 51.

Figure 5:
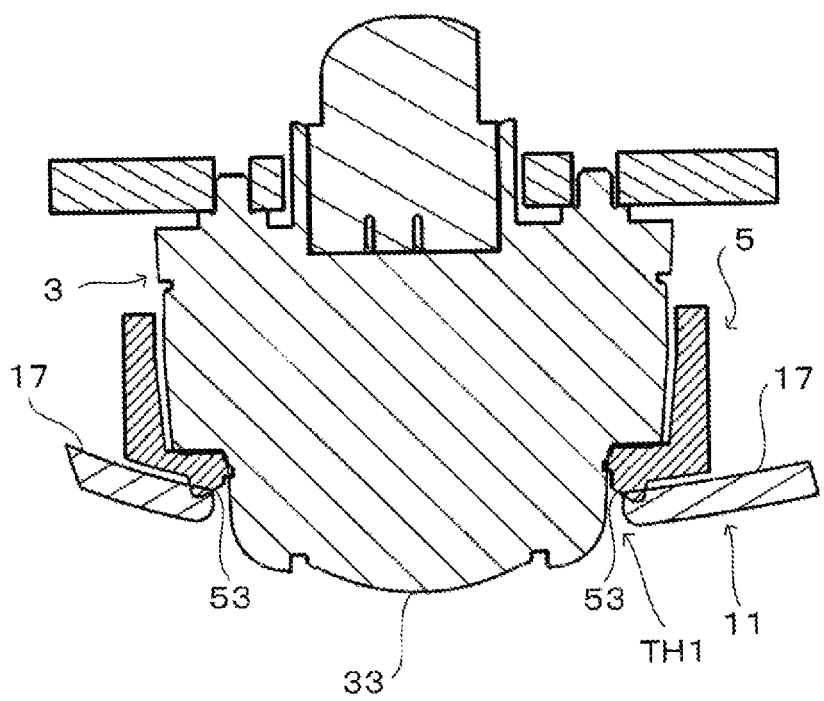
FIG. 5 is a cross-sectional view illustrating the image pickup device shown in FIG. 3 that is mounted in a housing.

Next, the worker mounts bracket 7 to the interior of housing 11. Specifically, after through-holes TH3 and TH4 of bracket 7 are positioned to the screw holes of bosses 19b and 19a, respectively, bracket 7 is screw-fastened to bosses 19a and 19b. Thereby, as illustrated in FIG. 5, first rib 53 of seal member 5 is pressed against the circumferential edge around through-hole TH1 of housing 11 (specifically, inner wall 17). Here, the three-dimensional shape of the end portion of first rib 53 is designed to match and fit the curved surface shape of the circumferential edge of through-hole TH1, and therefore, the deformed amount resulting from the pressing can be prevented from greatly being different depending on the position of first rib 53. As a result, wind is prevented from entering the interior of housing 11 while the vehicle equipped with image pickup device 3 is traveling, and generation of wind noise can be prevented.

4. Additional Notes

Noted that, as illustrated in FIGS. 2 and 3, the thickness of latch parts 55a and 55b along longitudinal axis b may be varied in order to provide latch parts 55a and 55b with appropriate elasticity.

Meanwhile, when latch parts 55a and 55b are latched into engaging parts 71a and 71b, respectively, the fore-end portions of latch parts 55a and 55b are allowed to protrude in optical axis direction a with respect to the major surface of bracket 7. In this case, in order to prevent seal member 5 from being easily disengaged from bracket 7 during the production and assembling process, second ribs 73a and 73b are preferably formed so as to be adjacent to the respective slits in the major surface of bracket 7, as illustrated in FIG. 4. Each of second ribs 73a and 73b has a protrusion amount such as to fit latch parts 55a and 55b, respectively.

Moreover, latch parts 55a and 55b have different shapes from each other. However, this is merely illustrative, and latch parts 55a and 55b may have symmetrical shapes with respect to optical axis direction a. In this case as well, the shapes of engaging parts 71a and 71b are matched to the shapes of latch parts 55a and 55b, respectively.

INDUSTRIAL APPLICABILITY

The image pickup device according to the present disclosure makes it possible to reduce wind noise and is suitable for vehicle on-board applications.

REFERENCE MARKS IN THE DRAWINGS 1 vehicle outside rearview mirror unit
11 housing
13 rearview mirror
15 support member
17 lower wall
19a, 19b boss
3 image pickup device
31 main member
33 lens
35 connector
5 seal member
51 main body
53 first rib
55a, 55b latch part
7 bracket
71a, 71b engaging part
73a, 73b second rib

The invention claimed is:
1. An on-vehicle image pickup device to be mounted to a housing provided with a through-hole, the on-vehicle image pickup device comprising:
   a main member to be secured to an interior of the housing;
   a lens disposed at one end of the main member;
   a seal member formed of an elastic body, the seal member including a rib;
   a plurality of latch parts disposed on the seal member, the latch parts facing each other along a direction perpendicular to the optical axis direction and extending along the optical axis direction; and
   a bracket provided with a plurality of engaging parts into which the plurality of latch parts are fitted, respectively, the bracket being secured to the main member, wherein each of the plurality of latch parts has a different shape from each other, and each of the plurality of latch parts is fitted into a corresponding one of the plurality of engaging parts, and wherein the rib surrounds the lens in plan view as viewed along an optical axis direction of the lens, and an end portion of the rib that faces in an opposite direction to the optical axis direction has a shape that matches a curved surface shape of a circumferential edge of the through-hole of the housing.

2. A vehicle outside rearview mirror unit comprising:

a housing provided with a through-hole; and an on-vehicle image pickup device including:

a main member secured to an interior of the housing;

a lens disposed at one end of the main member so as to face an outside of the housing through the through-hole;

a seal member formed of an elastic body, the seal member including a rib;

a plurality of latch parts disposed on the seal member, the latch parts facing each other along a direction perpendicular to the optical axis direction and extending along the optical axis direction; and a bracket being provided with a plurality of engaging parts into which the plurality of latch parts are fitted, respectively, the bracket being secured to the main member, wherein each of the plurality of latch parts has a different shape from each other, and each of the plurality of latch parts is fitted into a corresponding one of the plurality of engaging parts, and wherein the rib surrounds the lens in plan view as viewed along an optical axis direction of the lens, and an end portion of the rib that faces in an opposite direction to the optical axis direction has a shape that matches a curved surface shape of a circumferential edge of the through-hole of the housing.

\* \* \* \* \*